United States Patent [19]
Hayasaka

[11] Patent Number: 5,201,238
[45] Date of Patent: Apr. 13, 1993

[54] SHIFTING DEVICE FOR AN ENGINE

[75] Inventor: Kenichi Hayasaka, Hamamatsu, Japan

[73] Assignee: Yamaha Hatsudoki Kabushiki Kaisha, Iwata, Japan

[21] Appl. No.: 830,948

[22] Filed: Feb. 4, 1992

[30] Foreign Application Priority Data

Feb. 6, 1991 [JP] Japan .................................. 3-36921

[51] Int. Cl.$^5$ ............................................. B63H 21/28
[52] U.S. Cl. .................................. 74/473 R; 74/500.5; 74/501.5 R; 440/86; 440/900
[58] Field of Search ........... 74/473 R, 500.5, 501.5 R; 440/86, 900

[56] References Cited

U.S. PATENT DOCUMENTS

| | | | |
|---|---|---|---|
| 3,757,612 | 9/1973 | Schaefer | 74/500.5 X |
| 4,641,816 | 2/1987 | Kishida et al. | 74/501.5 R |
| 4,884,468 | 12/1989 | Muramatsu et al. | 74/500.5 X |
| 4,924,724 | 5/1990 | Yoshimura | 74/473 R |
| 4,963,109 | 10/1990 | Hayasaka | 440/86 X |

FOREIGN PATENT DOCUMENTS

| | | | |
|---|---|---|---|
| 63-137098 | 6/1988 | Japan | 440/86 |
| 1174618 | 8/1985 | U.S.S.R. | 74/500.5 |
| 2168022 | 6/1986 | United Kingdom | 440/86 |

*Primary Examiner*—Allan D. Herrmann
*Assistant Examiner*—William O. Trousdell
*Attorney, Agent, or Firm*—Ernest A. Beutler

[57] ABSTRACT

A shifting device for shifting a clutch of an engine transmission in a marine propulsion unit having an outdrive unit. The shifting device includes an actuator which is releasably connected at one end to a remotely positioned operator by a cable and releasably connected at the other end to a transmission lever on the propulsion unit for adjusting the lever in response to movement of the operator. The actuator includes a moveable member which is slidably supported in a guideway formed in the outdrive unit to minimize the force required to be exerted on the cable at its connection with the actuator, to improve the durability of the cable, and to facilitate assembly and maintenance work of the shifting device and propulsion unit.

10 Claims, 5 Drawing Sheets

SHIFTING DEVICE FOR AN ENGINE

BACKGROUND OF THE INVENTION

This invention relates to a shifting device for the transmission of an engine, and more particularly to an improved shifting device for shifting an engine transmission which includes an actuator member connected to a remotely positioned operator by a cable for adjusting a transmission lever upon movement of the operator, wherein the actuator member is securely supported to minimize the force required to be exerted on the cable at its connection with the actuator, to improve the durability of the cable and to facilitate assembly and maintenance work of the shifting device and propulsion unit.

One type of shifting device has been employed for operating the transmission of an inboard/outboard type of propulsion unit having an engine within the hull of an associated watercraft and an outboard portion attached to the transom of the hull. This type of shifting device utilizes an operator that is appropriately located in the hull near the other controls of the watercraft and is connected with a transmission lever on the outboard portion through a shift cable and an actuator located between the the operator and the transmission lever. Typically, the shift cable includes an outer protective cable that is secured on the side of the hull and a flexible inner cable which is slidably movable within the outer cable for transmitting movement between the operator and the in-between actuator. One end of the inner cable is connected to the operator and the other end is connected to the actuator which is, in turn, connected directly to the transmission lever for actuating it in response to movement of the operator.

With this type of arrangement, the inner cable may be disconnected and connected with the in-between actuator member so that the outboard portion may be separated from and mounted to the hull without much disassembly and assembly of the shifting device. This offers the advantage of relatively easy assembly and maintenance of the shifting device.

However, there have been certain disadvantages associated with this type of construction and arrangement as well. Previously, the in-between actuator member has not been securely fixed on either the outboard portion or the hull. Therefore, when the operator is moved to push or pull the attached end portion of the inner cable, the connection of the inner cable and the actuator may be displaced laterally. This tends to cause reduced responsiveness in the shifting operation and may also cause damage to the inner cable end that is in connection with the actuator member. Connecting and disconnecting the inner cable from the actuator member also tends to be somewhat troublesome when the actuator member is not securely supported.

It is, therefore, a principal object of this invention to provide an improved shifting device for shifting the transmission of an engine which has an operator for transmitting movement to a transmission lever through a cable and an actuator member which is positioned between the cable and lever and which is securely supported to minimize the force required to be exerted on the cable at its connection with the actuator, to improve the durability of the cable and to facilitate assembly and maintenance of the shifting device.

SUMMARY OF THE INVENTION

This invention is adapted to be embodied in a shifting device for shifting a clutch of a transmission. The shifting device comprises a controlled member for moving the clutch to a selected shift condition, and actuator including a movable member for actuating the controlled member and a flexible transmitter for transmitting movement to the actuator from a remote location. In accordance with the invention, a guideway is provided in which the movable member of the actuator is slidably supported such that the guideway does not move when the movable member is moved.

In another embodiment, a shifting device is provided for shifting a clutch of a transmission in a marine propulsion unit having an outdrive unit. The shifting device comprises a controlled member for moving the clutch to a selected shift condition, an actuator which includes a moveable member for actuating the controlled member and a flexible transmitter for transmitting movement to the actuator from a remote location. In accordance with this embodiment of the invention, a guideway is formed in the outdrive unit and the moveable member is slidably supported in this guideway.

DETAILED DESCRIPTION OF THE PREFERRED EMBODIMENTS

Figure 1:
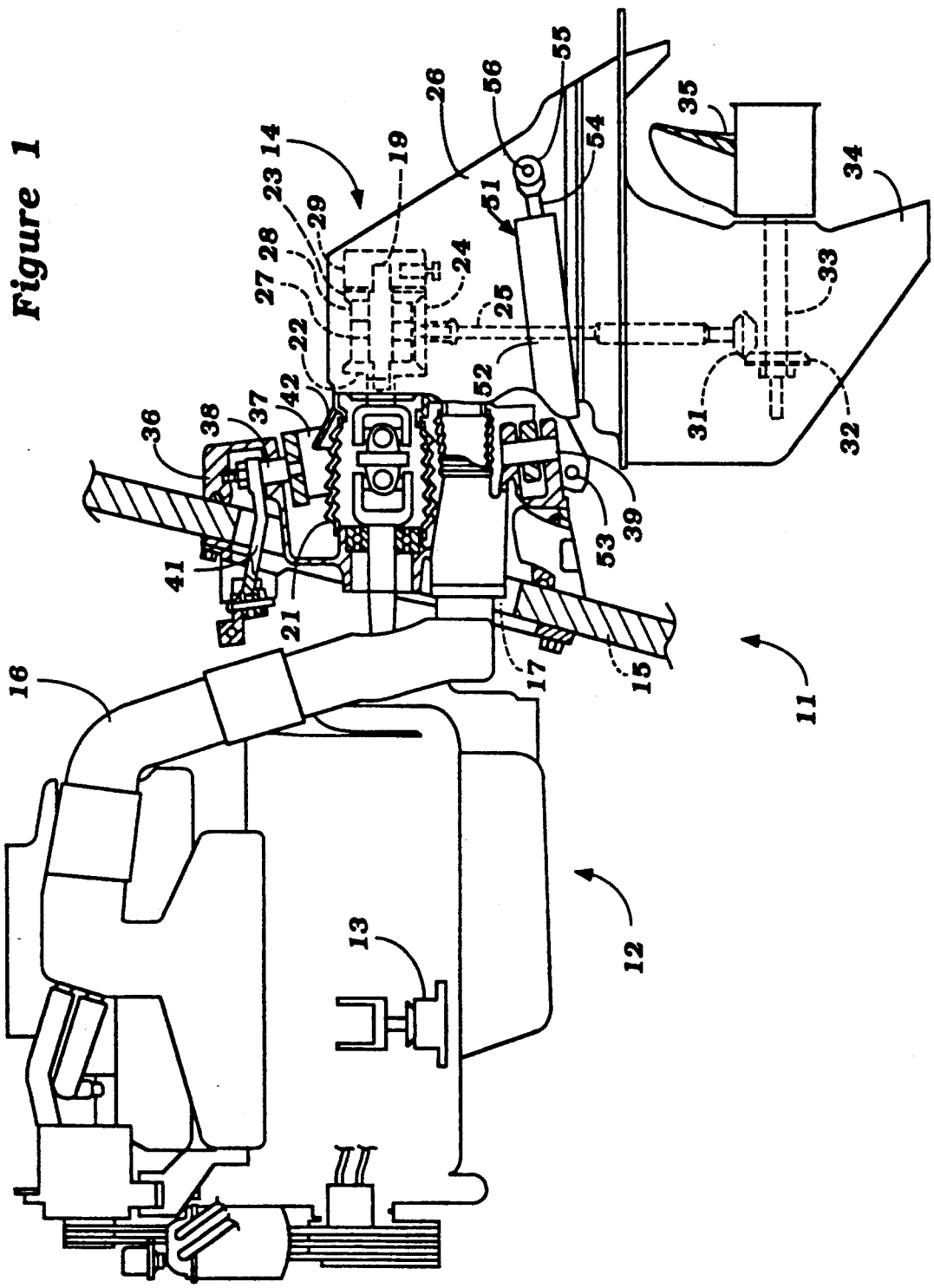
FIG. 1 is a side elevational view of a marine propulsion unit which includes an engine and an outdrive unit attached to the hull of an associated watercraft, and a shifting device constructed in accordance with an embodiment of the invention.

Referring first to FIG. 1, a portion of the hull of a watercraft having a shifting device constructed in accordance with an embodiment of the invention is identified generally by the reference numeral 11. The watercraft is, in the illustrated embodiment, propelled by an inboard/outboard type of propulsion unit consisting of an internal combustion engine 12 secured within the hull 11 by engine mounts 13 and an outdrive unit identified generally by the reference numeral 14 and attached to the transom 15 of the hull 11.

The engine 12 includes an exhaust pipe 16 which extends from the exhaust manifold of the engine 12 through an opening 17 in the transom 15. Exhaust gases from the engine 12 are discharged from the exhaust pipe 16 out an exhaust opening in the propeller through an exhaust bellows 18 and an exhaust passage (not shown) formed in the outdrive unit 14.

The engine 12 drives an output shaft which extends through the opening 17 and is coupled to a input clutch shaft 19 of the outdrive unit 14 through a universal connection 20 so as to accommodate steering and tilt and trim movement of the outdrive unit 14. A protective bellows 21 covers and protects the universal joint 20. The input shaft 19 drives a forward, neutral, reverse transmission which comprises forward and reverse driving bevel gears 22 and 23 respectively that are journaled on the input shaft 19 for free rotation. A driven bevel gear 24 is affixed for rotation on a driveshaft 25 that is, in turn, journaled for rotation about a vertically extending axis in an upper unit 26 of the outdrive 14. Forward and reverse hydraulic clutches 27 and 28 are affixed for rotation on the clutch shaft 19 between the gears 22 and 23 and are selectively engageable with their respective driving bevel gear 22 or 23. These clutches 27 and 28 are selectively operated by a clutch operating unit 29 to transmit the power of the input shaft 19 to the forward or the reverse driving bevel gear 22 or 23 so that the driveshaft 25 may be rotated in the forward or reverse direction through the driven bevel gear 24.

The driveshaft 25 has affixed to its lower end a pinion gear 31 that drives a corresponding gear 32 affixed to a propeller shaft 33 that is journaled for rotation within a lower unit 34 of the outdrive unit 14. A propeller 35 is affixed to the propeller shaft 33 for propelling the hull 11 in selected forward or reverse directions.

Figure 2:
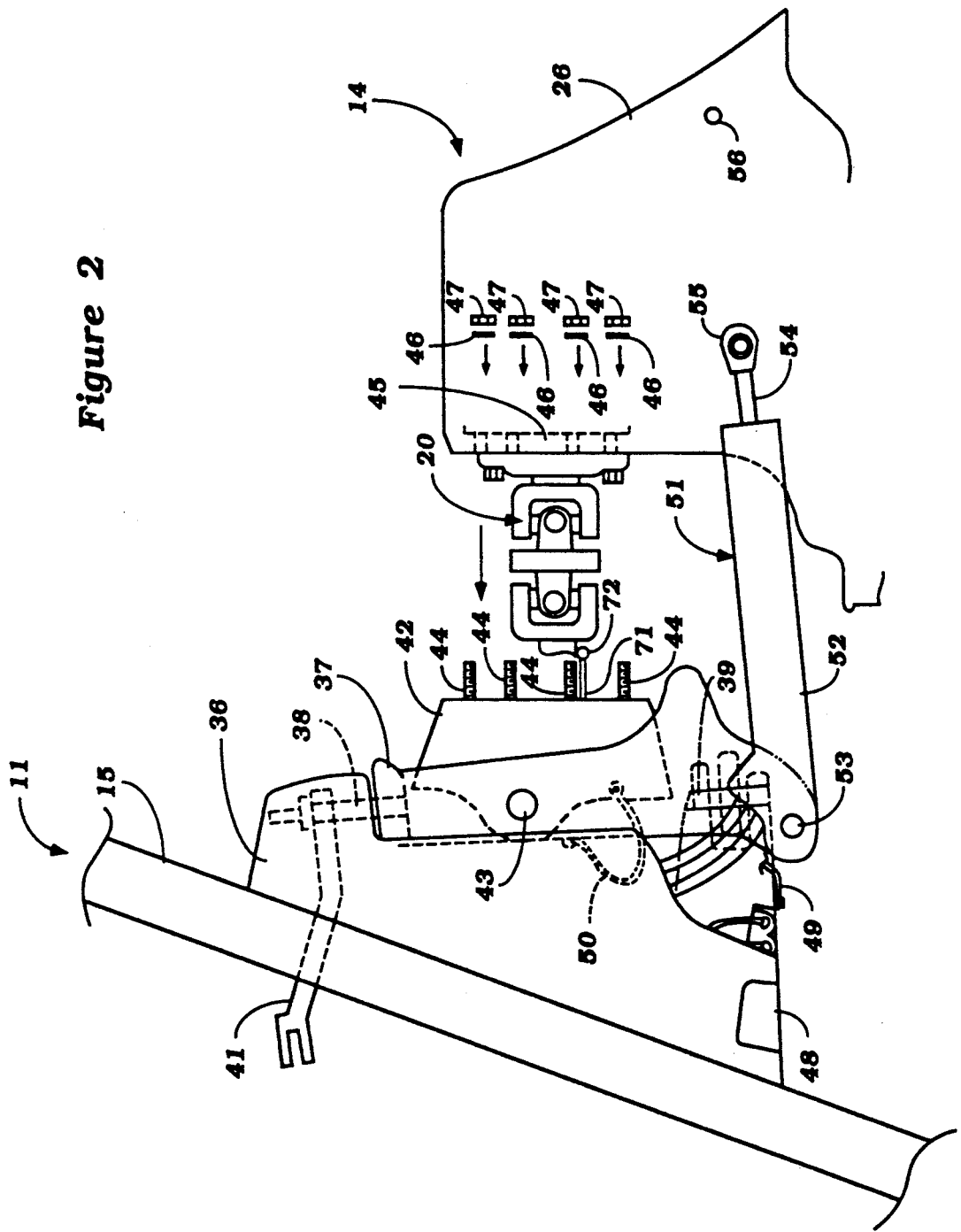
FIG. 2 is an enlarged side view showing the connection of the outdrive unit to the hull of the associated watercraft.

Referring now to FIG. 2, in addition to FIG. 1, the outdrive unit 14 further includes a gimbal housing 36 that is affixed to the transom 15 and which supports a gimbal ring 37 for steering movement of the outdrive unit 14 about upper and lower generally vertically extending pivot shafts 38 and 39 which are attached to the gimbal ring 37 and journaled for rotation within the gimbal housing 36. Steering movement is effected by a steering lever 41 that is secured on the upper pivot shaft 38. A swivel bracket 42, mounted on the gimbal ring 37 by means of a tilt shaft 43 for tilt and trim movement, has a plurality of bolts 44 which extend rearwardly and are adapted to be received within corresponding mounting bores in a mounting area 45 on the outdrive unit 14. The outdrive unit 14 is fastened on these bolts 44 by means of washers 46 and nuts 47.

The gimbal housing 36 is provided with an electrode 48 at its lower portion. A first grounding wire 49 electrically connects the gimbal housing 36 with the gimbal ring 37 and a second grounding wire 50 electrically connects the gimbal housing 36 with the swivel bracket 42.

A pair of linear fluid motors 51 are provided for effecting tilt and trim movement of the outdrive unit 14. Each fluid motor 51 includes a cylinder housing 52 that is journaled at one end of the gimbal ring 37 by means of a pivot pin 53. A piston is slideably moveable within each cylinder housing 52 and has connected to it a piston rod 54 which extends out the other end of the cylinder housing 52. At the other end of each piston rod 54 is an enlarged connecting portion 55 which is removably connected to the side of the upper unit 26 of the outdrive 14 by a pivot pin 56.

To mount the outdrive unit 14, the universal joint 20 is inserted through the bellows 21 and coupled to the engine output shaft, the connecting portions 55 of the fluid motors 51 are connected with their respective pivot pins 56 on the outdrive 14, and the outdrive unit 14 is then affixed to the swivel bracket 42 as previously described.

Figure 3:
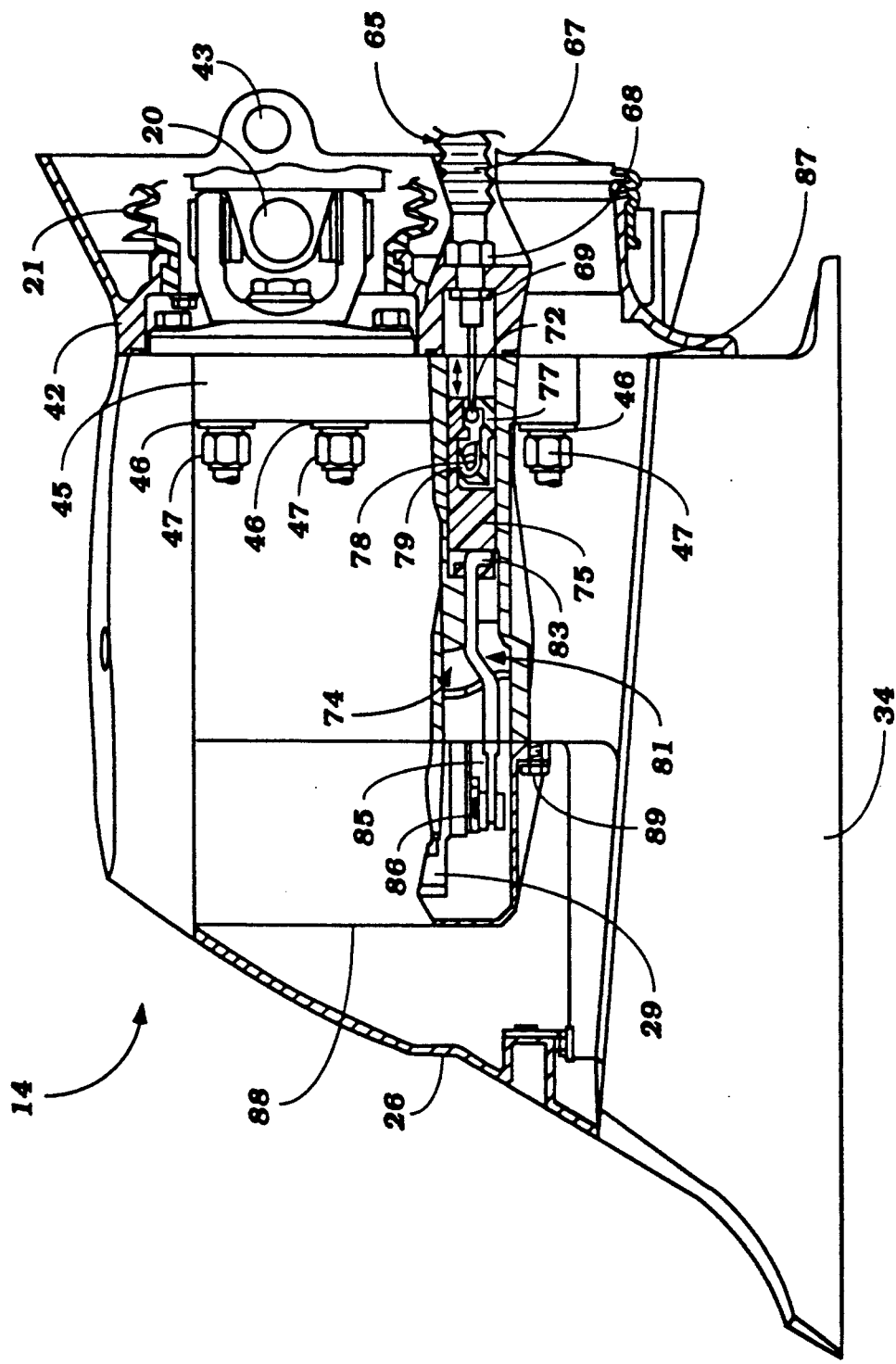
FIG. 3 is an enlarged side view with portions shown in cross section and other portions broken away illustrating the actuator supported in a guideway formed in the upper unit of the outdrive unit.
Figure 4:
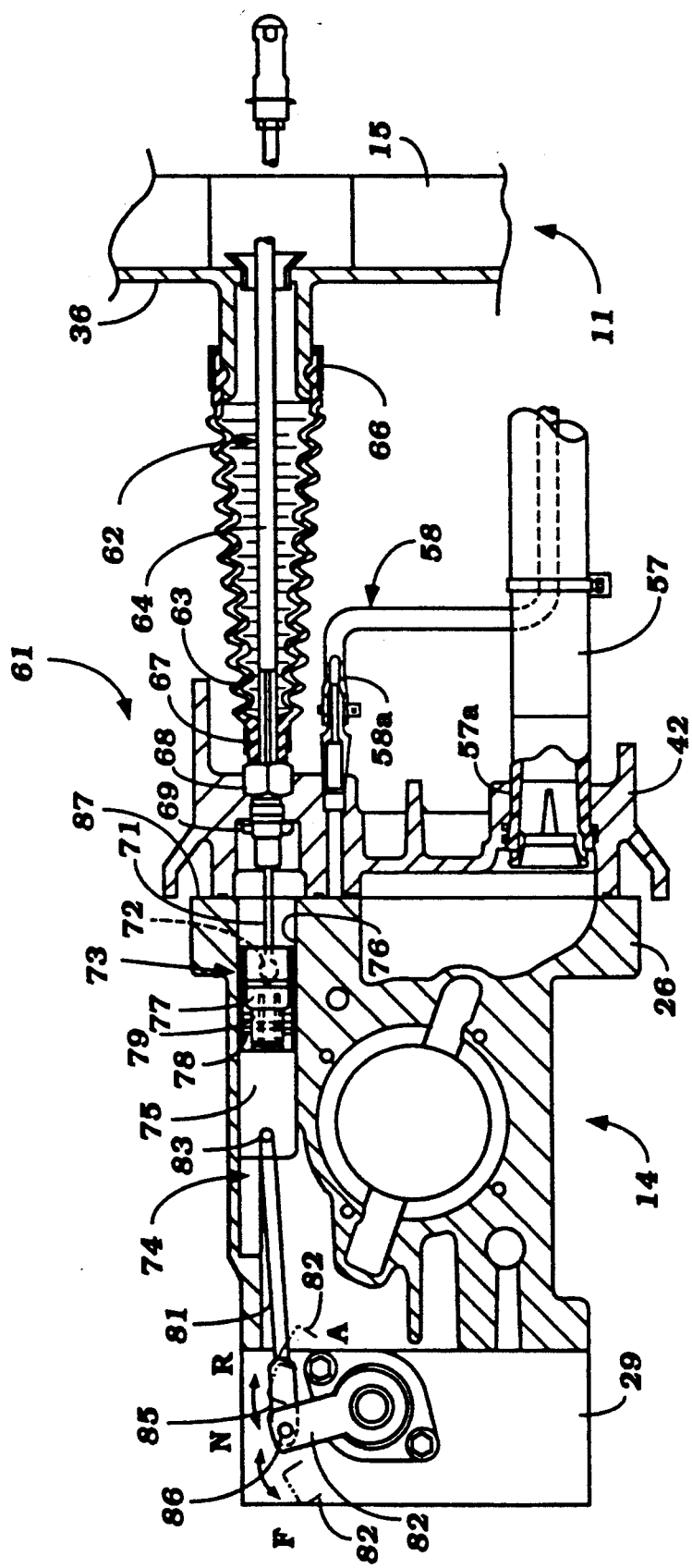
FIG. 4 is an enlarged bottom view with portions shown in cross section and other portions broken away showing the components of the shifting device.

Referring now to FIGS. 3 and 4, an inlet pipe 57 has an end portion 57a which is inserted into the swivel bracket 42 for communication with a corresponding water inlet passage formed in the outdrive unit 14. Water for cooling the engine 12 is introduced through the passage and the inlet pipe 57 and transferred to a water cooling jacket of the engine 12. An end portion 58a of a speedometer water pressure inlet tube 58 is also inserted and fixed in the swivel bracket 42 for communication with a corresponding passage in the propulsion unit. As shown in FIG. 4, the tube 58 extends from the swivel bracket 42 and is combined with the inlet pipe 57 by fastener means. Both the inlet pipe 57 and inlet tube 58 are made of flexible materials such as rubber to accommodate steering and tilting movement of the propulsion unit.

In accordance with the invention, a shifting device is provided for shifting the transmission of the propulsion unit and is identified by the reference numeral 61. This shifting device 61 comprises a shift cable 62 that includes a flexible transmitter 63 connected at one end to a transmission selector (not shown) appropriately located in the hull 11 of the watercraft for selecting between the forward, neutral and reverse shift conditions. The flexible transmitter 63 is slideably supported in a protective sheath 64, both of which extend through the hull 11 and through openings in the gimbal housing 36 and swivel bracket 42 where the protective sheath 64 is fastened at its remote end. A flexible boot 65 covers that portion of the cable 62 extending between the gimbal housing 36 and the swivel bracket 42. One end portion 66 of the flexible boot 65 is adapted for connection to a cylinder-like projection on the gimbal housing 36. The other end portion 67 of the flexible boot 65 has affixed to it a locking member 68 which is inserted in and fastened on the swivel bracket 42 through a lock nut 69. The end portion 71 of the inner cable 63 away from the transmission selector extends through the locking member 68 and lock nut 69 and has a ball member 72 formed at the end that is adapted for engagement with a slide element 73 of an actuator, identified generally by the reference numeral 74.

Figure 5:
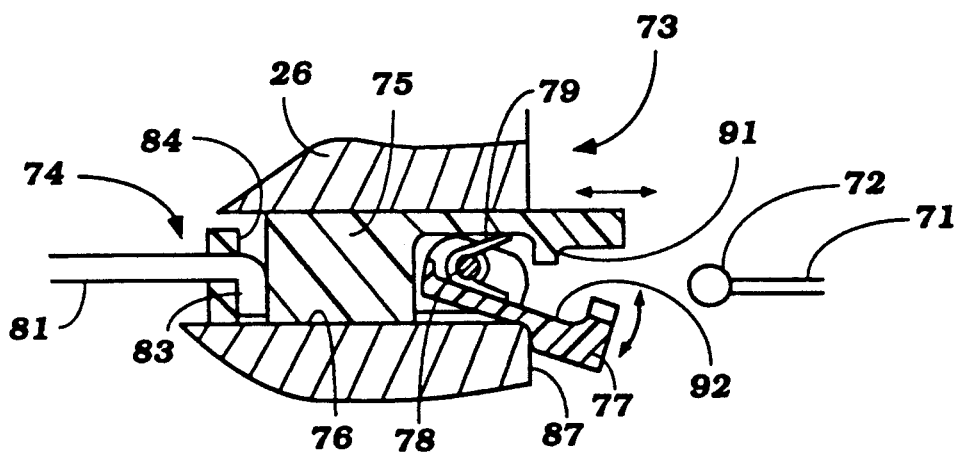
FIG. 5 is a cross sectional view showing the interconnection between the actuator and inner cable of the shifting device.

The slide element 73 is comprised of a piston 75 which is slideably moveable within a guideway 76 formed in the upper unit 26 of the outdrive 14 and a lower jaw portion 77 which is pivotally connected with the piston 75 by means of a connecting pin 78. The guideway 76 is formed with an opening toward the hull 11 and is defined by an upper and lower wall and two side walls for slidably supporting the slide element 73. A torsion spring 79 encircles the pin 78 and has opposing ends which extend outward, one of which bears against an upper jaw portion formed by the piston 75 and the other of which engages the lower jaw portion 77. The spring 79 acts to urge or bias the lower jaw portion 77 toward the open position as shown in FIG. 5.

The actuator 74 further includes a connecting member 81 for connecting the slide element 73 with a controlled member in the form of a clutch lever 82 on the outdrive unit 14. As shown in FIG. 5, the connecting member 81 has an L-shaped portion 83 at one end adapted for pivotal engagement with an opening 84 in the piston 75. At its other end, the connecting member 81 has an enlarged end portion 85 having an aperature for pivotal connection with the clutch lever 82 by means of a pin 86.

To connect the connecting member 81 with the piston 75 when the outdrive unit 14 is disassembled from the swivel bracket 42, as shown in FIG. 2, the piston 75 and lower jaw 77 are removed from the guideway 76 through its opening at the end surface 87 of the upper unit 26 which adjoins the swivel bracket 42. The L-shaped portion 83 of the connecting member 81 is then connected with the piston 75 and the other end portion 85 inserted into the guideway opening and connected with the clutch lever 82. Thereafter, a cover 88 for the hydraulic clutch operating unit 29 is attached on the upper unit 26 by means of bolts 89.

The flexible transmitter 63 may also be connected with or disconnected from the piston 75 and lower jaw 77 assembly when the outdrive unit 14 is disconnected from the swivel bracket 42. If the piston 75 and lower jaw 77 are already in the guideway 76 when the outdrive unit 14 is removed from the swivel bracket 42, the piston 75 and lower jaw 77 are moved so that they project out the guideway opening in the end surface 87. If the connecting member 81 is connected between the piston 75 and the clutch lever 82, the latter component will need to be pivoted to a position designated by the letter A in FIG. 4 to accommodate such forward movement of the piston 75. When the piston 75 and lower jaw 77 are projected out of the guideway opening in the end surface 87, as shown in FIG. 5, the lower jaw 77 is opened relative to the upper jaw of the piston 75 by the force of the spring 79 to expose a pair of cable catch portions, one 91 formed on the upper jaw of the piston 75 and the other 92 formed on the lower jaw 77 and positioned opposite catch portion 91. The clutch lever 82 is held at position A by the frictional force created by the spring 79 in opening the lower jaw 77. In this state, the engaging ball 72 of the flexible transmitter 63 may be inserted or removed from between the upper and lower jaws for engagement or disengagement with their respective catch portions 91 and 92.

In the engagement process, after the ball member 72 is inserted between the jaw portions, the piston 75 and lower jaw 77 assembly are moved back into the guideway 76, whereby the lower jaw 77 is closed by the adjacent surface of the guideway 76 against the force of the torsion spring 79. As a result, the engaging ball 72 becomes securely engaged between the catch portions 91 and 92 to engage the flexible transmitter 63 with the slide element 73. While the piston 75 and lower jaw 77 assembly are moved back into the guideway 76, the outdrive unit 14 may be pushed against the swivel bracket 42.

When the system is fully assembled, the slide element 73 is moved along the guideway 76 to actuate the clutch lever 82 in response to movement of the transmission selector which is operably connected to the slide element 73 by the flexible transmitter 63. The lower guideway wall keeps the lower jaw 77 in the closed position during operation and the end wall of the swivel bracket 42 closes the guideway opening in surface 87 to prevent the piston 75 and lower jaw 77 from projecting out and opening. This keeps the ball member 72 engaged with the catch portions 91 and 92 of the slide element 73.

With this arrangement wherein the slide element 73 is pivotally connected with the clutch lever 82 through the connecting member 81 and is securely supported within the guideway 76, only a small force need be exterted on the end portion 71 of flexible transmitter 63 connected with the slide element 73 to achieve the desired shifting. As a result, the durability of the end portion 71 is greatly improved.

When dismounting the outdrive unit 14 from the swivel bracket 42, the slide element 73 is pulled forward at the same time until it projects out of the opening of the guideway 76 in the end surface 87 so that the lower jaw 77 will be opened by the spring 79 to disengage the flexible transmitter 63 from the slide element 73. Thus, the flexible cable 63 may be easily connected or disconnected from the slide element 73 and clutch lever 82.

It should be readily apparent from the foregoing description that a very effective and responsive device for shifting the transmission of an engine has been illustrated and described. The shifting device is constructed to minimize the force that is exerted on the cable extending between the operator and the actuator at its connection with the actuator during shifting operation so as to improve the durability of the cable. The construction of the shifting device also allows for easy assembly, disassembly and maintainence. Although an embodiment of the invention has been illustrated and described, various changes and modifications may be made without departing from the spirit and scope of the invention, as defined by the appended claims.

I claim:

1. A shifting device for shifting a clutch of a transmission comprising a controlled member for moving the clutch to a shift condition, an actuator including a moveable member for actuating said controlled member, a flexible transmitter for transmitting movement to said actuator from a remote location, and a guideway wherein said moveable member includes a piston and a pivotal portion pivotally connected with said piston for movement between an open and a closed position, said movable member being slidably supported in said guideway.

2. A shifting device as recited in claim 1, wherein said actuator includes a connecting member for connection between said moveable member and said controlled element.

3. A shifting device as recited in claim 1, wherein said pivotal portion is a lower jaw portion.

4. A shifting device as recited in claim 3, further comprising means for biasing the lower jaw portion toward the open position.

5. A shifting device as recited in claim 4, wherein said piston has an upper jaw portion which cooperates with the lower jaw portion for releasably engaging said flexible transmitter.

6. A shifting device for shifting a clutch of a transmission in a marine propulsion unit having an outdrive unit comprising a controlled member for moving the clutch to a shift condition, an actuator including a moveable member for actuating said controlled member, a flexible transmitter for transmitting movement to said actuator from a remote location, and a guideway bored directly in the outdrive unit wherein said movable member is slidably supported directly in said guideway.

7. A shifting device as recited in claim 6, wherein said moveable member includes a connecting member for connection with said controlled member.

8. A shifting device as recited in claim 6, wherein said movable member includes a piston and a lower jaw portion pivotally connected with the piston for movement between an open position and a closed position.

9. A shifting device as recited in claim 7, further comprising means for biasing the lower jaw portion toward the open position.

10. A shifting device as recited in claim 9, wherein said piston has an upper jaw portion which cooperates with the lower jaw portion for releasably engaging said flexible transmitter.

* * * * *